United States Patent
Kurata et al.

(10) Patent No.: US 8,346,014 B2
(45) Date of Patent: Jan. 1, 2013

(54) IMAGE PROCESSING APPARATUS AND METHOD AND PROGRAM

(75) Inventors: Masatomo Kurata, Tokyo (JP); Makoto Murata, Tokyo (JP); Takashi Ogata, Tokyo (JP); QiHong Wang, Tokyo (JP)

(73) Assignee: Sony Corporation, Tokyo (JP)

( * ) Notice: Subject to any disclaimer, the term of this patent is extended or adjusted under 35 U.S.C. 154(b) by 1033 days.

(21) Appl. No.: 12/139,202

(22) Filed: Jun. 13, 2008

(65) Prior Publication Data

US 2008/0310725 A1 Dec. 18, 2008

(30) Foreign Application Priority Data

Jun. 15, 2007 (JP) ................. P2007-159468

(51) Int. Cl.
*G06K 9/46* (2006.01)
*G06K 9/54* (2006.01)
(52) U.S. Cl. .................... 382/284; 382/181
(58) Field of Classification Search .............. None
See application file for complete search history.

(56) References Cited

U.S. PATENT DOCUMENTS 6,078,726 A * 6/2000 Gotoh et al. ............. 386/239
2005/0262067 A1* 11/2005 Lee et al. ................. 707/3
2008/0138783 A1* 6/2008 Karkanias et al. ....... 434/322

FOREIGN PATENT DOCUMENTS

| JP | 62-299189 | 12/1987 |
| JP | 4-294694 | 10/1992 |
| JP | 11-289517 | 10/1999 |
| JP | 2002-94971 | 3/2002 |
| JP | 2002-344897 | 11/2002 |
| JP | 2003-283993 | 10/2003 |

* cited by examiner

*Primary Examiner* — Atiba O Fitzpatrick
*Assistant Examiner* — Thomas A James
(74) *Attorney, Agent, or Firm* — Finnegan, Henderson, Farabow, Garrett & Dunner, L.L.P.

(57) ABSTRACT

An image processing apparatus includes the following elements. An image storing section stores a plurality of images related to time information. A feature extracting section extracts feature amounts of each image stored in the image storing section. An image selecting section that selects at least one of images included in each overlap portion set of several or all of the images, stored in the image storing section, on the basis of the feature amounts associated with the respective images included in the overlap portion set, the overlap portion set including overlap portions of several or all of the images overlapping with respect to shooting time. A digest-image generating section generates a digest image of the images stored in the image storing section on the basis of the selected images.

13 Claims, 12 Drawing Sheets

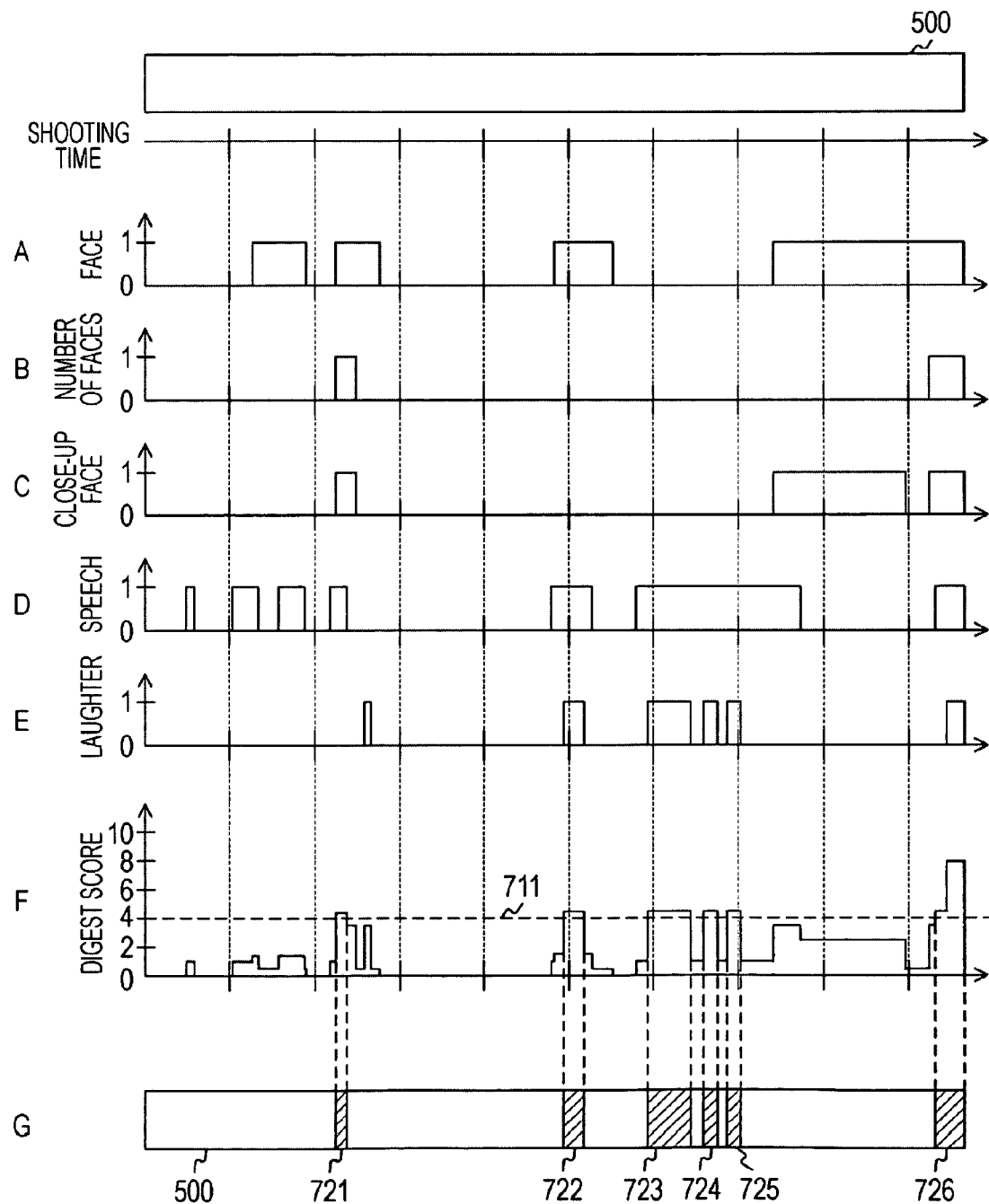

IMAGE PROCESSING APPARATUS AND METHOD AND PROGRAM

CROSS REFERENCES TO RELATED APPLICATIONS

The present invention contains subject matter related to Japanese Patent Application JP 2007-159468 filed in the Japanese Patent Office on Jun. 15, 2007, the entire contents of which are incorporated herein by reference.

BACKGROUND OF THE INVENTION

1. Field of the Invention

The present invention relates to image processing apparatuses and, in particular, to an image processing apparatus capable of editing image content, a method for image processing for the image processing apparatus, and a program that allows a computer to execute the method.

2. Description of the Related Art

In recent years, digital video cameras have spread. Accordingly, shooting an event, such as a wedding ceremony or reception, with a digital video camera by a guest invited to participate in the wedding reception have been popular. In an event, such as a wedding reception, where a lot of guests gather, many guests often shoot the same scene (e.g., a wedding-cake cutting scene). Accordingly, the same scene in one event may be captured as a plurality of moving images. Those captured moving images can be played on a display of a personal computer in, for example, a home.

For example, it is assumed that a moving image obtained with relatively long shooting time is played. When the whole of the moving image is played from the beginning, playback time lengthens. Unfortunately, viewer's interest in the moving image which is being played may diminish with the passage of the playback time. According to an approach to preventing the diminishment of the interest, the viewer may retrieve desired portions from the obtained moving image and the desired portions may be played sequentially. In this case, however, playback needs retrieval time. Furthermore, retrieval operation may often be complicated. Disadvantageously, the viewer's interest in the obtained moving image may diminish.

According to a proposed technique, before playback of a moving image, thumbnail images corresponding to respective portions of the moving image are generated and the moving image is played from a desired recording position using the generated thumbnail images. For example, Japanese Unexamined Patent Application Publication No. 11-289517 discloses a reproducing apparatus for generating a plurality of thumbnail images indicating respective scenes of a moving image recorded on a recording medium, displaying those thumbnail images so that a desired thumbnail image is selected from the displayed thumbnail images, and starting playback of the moving image from the beginning of the scene corresponding to the selected thumbnail image.

SUMMARY OF THE INVENTION

According to the above-described related-art technique, when a user views moving images obtained by shooting an event, such as a wedding reception, the user can start playback of a moving image from the top of a desired scene using displayed thumbnail images related to the moving image.

When an event, such as a wedding reception, is captured as a moving image by shooting, shooting time is often relatively long. In viewing a plurality of moving images obtained by shooting an event, which leads to relatively long shooting time, by quests, when thumbnail images are displayed using the above-described related-art technique, the number of thumbnail images displayed may be very large. In this case, it takes long time to select any one of the displayed thumbnail images. Disadvantageously, it is complicated to select any one of the displayed thumbnail images.

Furthermore, in many cases, those moving images are obtained by shooting an event at different viewing angles by the guests (photographers) at different positions. Accordingly, although displayed thumbnail images correspond to the same scene, the thumbnail images seem to show different scenes. In this case, the user may select the same scene more than once. Unfortunately, it is difficult to view the moving images with efficiency. In other words, it is difficult to efficiently view a plurality of moving images obtained by shooting the same event through a plurality of imaging devices.

Accordingly, it is desirable to efficiently view images obtained by shooting the same event through a plurality of imaging devices.

The present invention is made in order to solve the above-described problems. According to a first embodiment of the present invention, an image processing apparatus includes the following elements. An image storing section stores a plurality of images related to time information. A feature extracting section extracts the amounts of features (hereinafter, feature amounts) of each image stored in the image storing section. An image selecting section selects at least one of images included in each overlap portion set of several or all of the images, stored in the image storing section, on the basis of the feature amounts associated with the respective images included in the overlap portion set, the overlap portion set including overlap portions of several or all of the images overlapping with respect to shooting time. A digest-image generating section generates a digest image of the images stored in the image storing section on the basis of the selected images. Consequently, the first embodiment has an effect of selecting at least one of images included in each overlap portion set of a plurality of images overlapping with respect to shooting time on the basis of feature amounts associated with the images included in the overlap portion set, and generating a digest image of the images on the basis of the selected images.

In this embodiment, the apparatus may further include a digest-score calculating section that calculates a digest score of each image, the digest score being obtained by weighting and adding the extracted feature amounts. The image selecting section may compare the calculated digest scores of the respective images included in the overlap portion set to select one image with the highest digest score. Consequently, this embodiment has an effect of calculating a digest score of each image as a value obtained by weighting and adding feature amounts of the image, and comparing calculated digest scores of respective images included in each overlap portion set of a plurality of overlapping images to select one image with the highest digest score.

In this embodiment, the digest-image generating section may generate the digest image by arranging the selected images in time series. Consequently, this embodiment has an effect of generating a digest image by arranging selected images in time series.

In this embodiment, the images stored in the image storing section may be moving images captured in time series. The feature extracting section may extract the feature amounts of each moving image stored in the image storing section in time series every predetermined section. The image selecting section may select at least one moving image segment in each section, where several or all of the moving images stored in the image storing section overlap with respect to the shooting time, on the basis of the feature amounts extracted in the section. The digest-image generating section may generate the digest image on the basis of the selected moving image segments. Consequently, this embodiment has an effect of selecting at least one moving image segment in each section, where several or all of moving images overlap with respect to shooting time, on the basis of feature amounts extracted in the section, and generating a digest image on the basis of the selected moving image segments.

In this embodiment, the apparatus may further include an overlap-shooting-section extracting section that extracts each overlap shooting section, serving as a section where at least one of the moving images stored in the image storing section overlaps another moving image with respect to shooting time, on the basis of the time information. The feature extracting section may extract the feature amounts of the respective moving images included in the extracted overlap shooting section. The image selecting section may select a moving image segment in a section segment, where the moving images overlap with respect to the shooting time, of the extracted overlap shooting section. Consequently, this embodiment has an effect of extracting an overlap shooting section where at least one of moving images overlaps another moving image with respect to shooting time, and selecting a moving image segment in a section segment, where the moving images overlap with respect to the shooting time, of the extracted overlap shooting section. In this case, the overlap shooting section may be a section that includes at least one of the moving images, stored in the image storing section, overlapping with another moving image with respect to the shooting time and includes a predetermined number of moving images or more. Consequently, this embodiment has an effect of selecting a moving image segment in a section segment, where moving images overlap with respect to shooting time, of an overlap shooting section that includes a predetermined number of moving images or more.

In this embodiment, the image selecting section may select a moving image segment that does not overlap another moving image with respect to the shooting time in each section where the moving images stored in the image storing section do not overlap with respect to the shooting time. The digest-image generating section may generate the digest image by arranging the selected moving image segments in time series. Consequently, this embodiment has an effect of selecting a moving image segment that does not overlap another moving image with respect to shooting time in each section where moving images do not overlap with respect to the shooting time, and arranging moving image segments selected in sections where the moving images overlap with respect to the shooting time and moving image segments selected in sections, in each of which the selected moving image segment does not overlap another moving image with respect to the shooting time, in time series to generate a digest image.

In this embodiment, the apparatus may further include the following elements. A digest-score calculating section calculates a digest score of each moving image every predetermined section, the digest score being obtained by weighting and adding the extracted feature amounts. A threshold holding section holds a predetermined threshold. A digest-segment extracting section extracts a digest segment corresponding to each digest score at or above the threshold among the calculated digest scores. The image selecting section may compare the calculated digest scores in the extracted digest segment to select a moving image segment with the highest digest score. Consequently, this embodiment has an effect of extracting a digest segment corresponding to each digest score at or above the threshold, and comparing the digest scores in the extracted digest segment to select a moving image segment with the highest digest score.

According to a second embodiment of the present invention, an image processing apparatus includes the following elements. An image input section inputs a plurality of images related to time information. A feature extracting section extracts feature amounts of each input image. An image selecting section selects at least one of images included in each overlap portion set of several or all of the input images on the basis of the feature amounts associated with the respective images included in the overlap portion set, the overlap portion set including overlap portions of several or all of the images overlapping with respect to shooting time. A digest-image generating section generates a digest image of the input images on the basis of the selected images. Consequently, this embodiment has an effect of selecting at least one of input images included in each overlap portion set of several or all of the input images overlapping with respect to shooting time on the basis of feature amounts associated with the images included in the overlap portion set, and generating a digest image of the images on the basis of the selected images.

According to a third embodiment of the present invention, there is provided a method of image processing for an image processing apparatus including an image storing section that stores a plurality of images related to time information, a feature extracting section, an image selecting section, and a digest-image generating section. The method includes the steps of extracting feature amounts of each image stored in the image storing section, selecting at least one of images included in each overlap portion set of several or all of the images stored in the image storing section on the basis of the feature amounts associated with the respective images included in the overlap portion set, the overlap portion set including overlap portions of several or all of the images overlapping with respect to shooting time, and generating a digest image of the images stored in the image storing section on the basis of the selected images.

According to a fourth embodiment of the present invention, there is provided a program that allows a computer to execute the above-described method.

The embodiments of the present invention have an advantage in that images obtained by shooting the same event through a plurality of imaging devices can be efficiently viewed.

BRIEF DESCRIPTION OF THE DRAWINGS

FIG. 12 shows feature amounts extracted from the moving image 500, a digest score, and an example of extracted section segments of the moving image 500.

DESCRIPTION OF THE PREFERRED EMBODIMENTS

An embodiment of the present invention will be described in detail with reference to the drawings.

Figure 1:
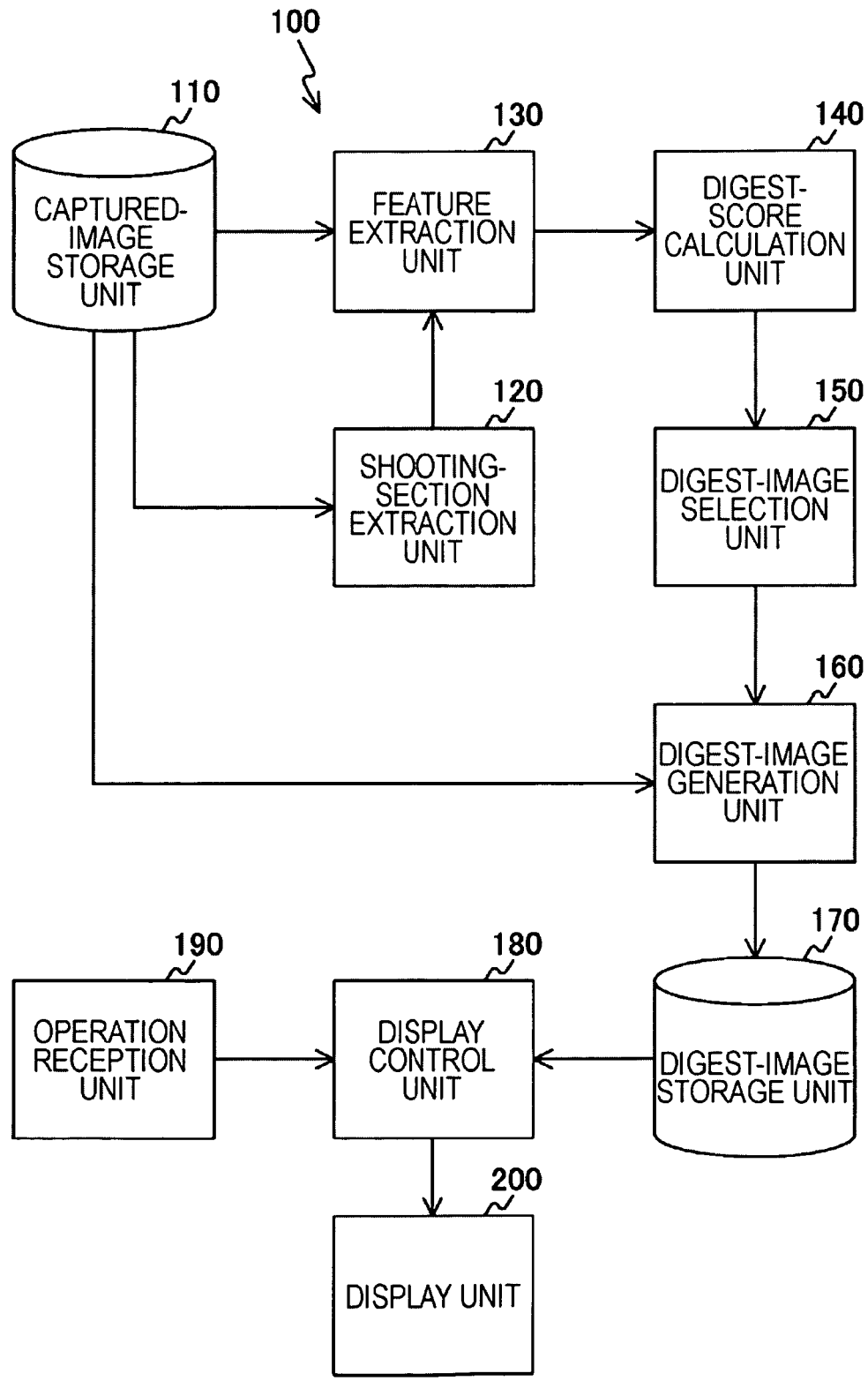
FIG. 1 is a block diagram showing the functional structure of an image processing apparatus 100.

FIG. 1 is a block diagram illustrating the functional structure of an image processing apparatus 100 according to an embodiment of the present invention. The image processing apparatus 100 includes a captured-image storage unit 110, a shooting-section extraction unit 120, a feature extraction unit 130, a digest-score calculation unit 140, a digest-image selection unit 150, a digest-image generation unit 160, a digest-image storage unit 170, a display control unit 180, an operation reception unit 190, and a display unit 200. The image processing apparatus 100 can be realized by, for example, a personal computer having a function of editing moving image content.

The captured-image storage unit 110 stores moving image content, e.g., a moving image captured through a digital video camera. The moving image content stored in the captured-image storage unit 110 is related to shooting time at which the content was obtained by shooting. The moving image content stored in the captured-image storage unit 110 contains at least one moving image, which was obtained by shooting through a digital video camera and was input to the image processing apparatus 100. In the present embodiment of the present invention, it is assumed that a plurality of moving images are recorded as blocks of content (hereinafter, content blocks) in the captured-image storage unit 110. In the following description, a scene simultaneously shot by a plurality of persons will be defined as an "exciting scene" on the basis of an experimental rule that an important scene is simultaneously shot by multiple people. In addition, each scene selected from an overlap between exciting scenes of moving images will be defined as a "highlight scene".

The shooting-section extraction unit 120 extracts a shooting section, in which a plurality of shootings were performed for the same period of time, on the basis of shooting times related to the respective moving-image content blocks stored in the captured-image storage unit 110. The shooting-section extraction unit 120 outputs the extracted shooting section to the feature extraction unit 130. The shooting-section extraction unit 120 can extract a shooting section under the condition that a predetermined number of moving-image content blocks are included in a shooting section in which a plurality of shootings were carried out for the same period. The extracted shooting section corresponds to an exciting scene. Consequently, exciting scenes are extracted from a plurality of moving-image content blocks, so that the extracted exciting scenes can be arranged in time series in units of exciting scenes. As for exciting scenes, for example, a wedding-cake-cutting scene and a scene of entertainment by a friend may be shot in a wedding reception. In an athletic meet, a relay race scene and a dance scene may be shot. Extraction of an exciting scene will be described in detail later with reference to FIG. 3.

The feature extraction unit 130 performs various image analysis processes on the moving-image content blocks, included in a shooting section extracted by the shooting-section extraction unit 120, out of the moving-image content blocks stored in the captured-image storage unit 110 to extract the amounts of features (hereinafter, "feature amounts") of each moving-image content block every predetermined section (for example, every second). The feature extraction unit 130 outputs the extracted feature amounts to the digest-score calculation unit 140. Those exciting scenes or feature amounts may be extracted at any time, e.g., when moving-image content blocks are recorded on the captured-image storage unit 110. Alternatively, the exciting scenes or feature amounts may be extracted in accordance with a digest-image generation instruction given by a user. The extraction of feature amounts will be described in detail later with reference to parts A to E FIG. 4.

The digest-score calculation unit 140 calculates a digest score of each moving-image content block every predetermined section, the digest score being obtained by multiplying each of the feature amounts, extracted by the feature extraction unit 130, by a predetermined weight and adding the resultant values. The digest-score calculation unit 140 outputs the obtained digest scores of the respective moving-image content blocks to the digest-image selection unit 150. The calculation of digest scores will be described in detail later with reference to part F of FIG. 4.

The digest-image selection unit 150 compares, in time series, the digest scores, calculated by the digest-score calculation unit 140, of the respective moving-image content blocks included in the shooting section extracted by the shooting-section extraction unit 120 to select the moving-image content block having the highest digest score in the shooting section. The digest-image selection unit 150 outputs address information (indicating a recording position in the captured-image storage unit 110) related to a segment of the selected moving-image content block to the digest-image generation unit 160. The selection of any moving-image content block will be described in detail later with reference to FIG. 6.

The digest-image generation unit 160 reads out a segment of the moving-image content block (hereinafter, "moving-image content segment"), selected by the digest-image selection unit 150, from the captured-image storage unit 110 on the basis of the address information output from the digest-image selection unit 150. The digest-image selection unit 150 arranges respective read-out moving-image content segments in time series to generate a digest image. In this instance, the digest image is a moving image obtained by arranging moving-image content segments, selected by the digest-image selection unit 150, in time series. The digest-image generation unit 160 outputs the generated digest image to the digest-image storage unit 170 and allows the digest-image storage unit 170 to store the digest image. The generation of a digest image will be described in detail later with reference to FIG. 6.

The digest-image storage unit 170 stores the digest image generated by the digest-image generation unit 160. The digest-image storage unit 170 outputs the digest image to the display control unit 180 in response to a control signal supplied from the display control unit 180.

When the operation reception unit 190 receives an operation input indicative of an instruction to play the digest image of the moving-image content blocks, the display control unit 180 reads out the digest image stored in the digest-image storage unit 170 and allows the display unit 200 to display the read-out digest image.

The operation reception unit 190 includes various operation keys. When receiving an operation input through any of those keys, the operation reception unit 190 outputs information indicating the received operation input to the display control unit 180. For example, the operation reception unit 190 includes a digest play button for an instruction to play a digest image. The digest play button and other buttons may be displayed on the display unit 200 and be pressed in response to an operation input received by the operation reception unit 190. Alternatively, at least part of the operation reception unit 190 may be incorporated into the display unit 200 to realize a touch panel.

The display unit 200 displays the digest image stored in the digest-image storage unit 170 in accordance with a control signal supplied from the display control unit 180. The display unit 200 may include, for example, a liquid crystal display (LCD).

Playback of a plurality of moving-image content blocks obtained through a plurality of imaging devices in one event (e.g., a wedding reception) will now be described in detail below with reference to FIG. 2.

Figure 2:
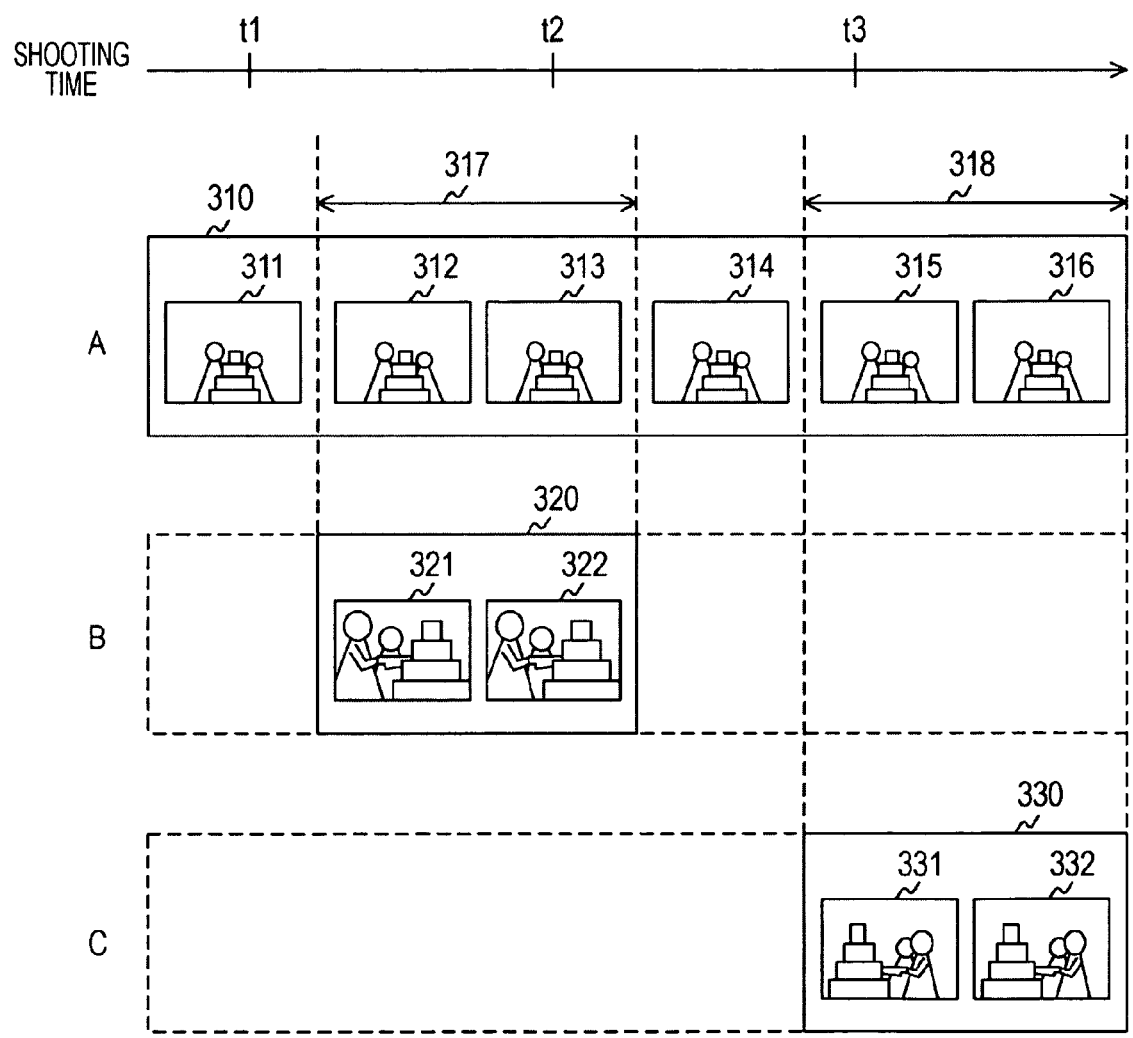
FIG. 2 schematically shows images included in moving image files 310, 320, and 330 obtained by shooting a wedding reception.

FIG. 2 schematically shows images included in moving image files 310, 320, and 330 obtained by shooting a wedding reception. Referring to FIG. 2, images 311 to 316 included in the moving image file 310, images 321 and 322 included in the moving image file 320, and images 331 and 332 included in the moving image file 330 are arranged along time axes t1 to t3. It is assumed that the moving image files 310, 320, and 330 are obtained by shooting the wedding reception by three persons, i.e., Mr. A, Mr. B, and Mr. C, respectively, and each moving image file includes a wedding-cake-cutting scene. Furthermore, it is assumed that the images 312, 313, 321, and 322 are segments of the moving images captured simultaneously and the images 315, 316, 331, and 332 are segments of the moving images captured simultaneously.

Part A of FIG. 2 shows the moving image file 310 obtained by shooting by Mr. A and also includes the images 311 to 316 contained in the moving image file 310. The images 311 to 316 are obtained by shooting a bridal couple (or bride and groom) cutting a wedding cake from the front from a relatively distant position. Part B of FIG. 2 shows the moving image file 320 obtained by shooting by Mr. B and also includes the images 321 and 322 contained in the moving image file 320. The images 321 and 322 are obtained by shooting the former half of the wedding-cake-cutting scene where the bridal couple were shot from the right side from a relatively close position. Part C of FIG. 2 shows the moving image file 330 obtained by shooting by Mr. C and also includes the images 331 and 332 contained in the moving image file 330. The images 331 and 332 are obtained by shooting the latter half of the wedding-cake-cutting scene where the bridal couple were shot from the left side from a position substantially corresponding to the midpoint between Mr. A and Mr. B.

As shown in parts A to C of FIG. 2, exciting scenes, such as the wedding-cake-cutting scene, in the wedding reception tend to be simultaneously shot by a plurality of persons. To view a plurality of moving image files including temporally overlapping images of the same scene, for example, the moving image file 310 including the images 311 to 316 obtained by shooting by Mr. A may be played, the moving image file 320 including the images 321 and 322 obtained by shooting by Mr. B may be played, and after that, the moving image file 330 including the images 331 and 332 obtained by shooting by Mr. C may be played. In the moving image file 310, a recording portion 317 includes the images 312 and 313 obtained by shooting the same scene as that in the moving image file 320 at a different angle and distance. In addition, a recording portion 318 includes the images 315 and 316 obtained by shooting the same scene as that in the moving image file 330 at a different angle and distance. Accordingly, when the moving image files 310, 320, and 330 are sequentially played as described above, the user has to watch the scene, which the user has already viewed, several times. In this case, playback time becomes long because the moving image files 310, 320, and 330 are sequentially played. In addition, the user's interest in the moving image files 320 and 330 may diminish because the user has already viewed the same scene.

According to the present embodiment of the present invention, to view a plurality of moving-image content blocks that are obtained by shooting by different persons and include the same scene, appropriate segments of the respective moving-image content blocks obtained by shooting by the respective persons from different points of view are combined and the resultant image is played. Consequently, playback time can be reduced and the moving-image content blocks can be played while a viewer's interest can be kept.

For example, as for the moving image files 310, 320, and 330 illustrated in parts A to C of FIG. 2, the bride and groom shown in the moving image file 320 or 330 are larger than those in the moving image file 310. Accordingly, for example, overlap recording-portion sets (or overlap portion sets) of the moving image files 310, 320, and 330 are edited such that the recording portion 317 including the images 312 and 313 of the moving image file 310 is replaced with a recording portion including the images 321 and 322 of the moving image file 320 and the recording portion 318 including the images 315 and 316 thereof is replaced with a recording portion including the images 331 and 332 of the moving image file 330. Consequently, after a recording portion including the image 311 of the moving image file 310 is played, the recording portion including the images 321 and 322 of the moving image file 320 can be played. Subsequently, after a recording portion including the image 314 of the moving image file 310 is played, the recording portion including the images 331 and 332 of the moving image file 330 can be played. By playing the moving image files 310, 320, and 330 as described above, the bride and groom are shown in larger form in shooting sections corresponding to the recording portions of the moving image files 320 and 330 and the wedding-cake-cutting scene of the moving image file 310 is viewed in other shooting sections. Consequently, the whole of the wedding-cake-cutting scene can be rapidly viewed in time series. In addition, appropriate moving-image content segments of this scene can be viewed. The edit of the moving image files will be described in detail later with reference to FIGS. 3 to 6.

A method of generating a digest image from a plurality of moving-image content blocks will now be described in detail with reference to the drawings. First, a method of extracting a shooting section corresponding to an exciting scene from a plurality of moving-image content blocks will be described in detail below with reference to FIG. 3.

Figure 3:
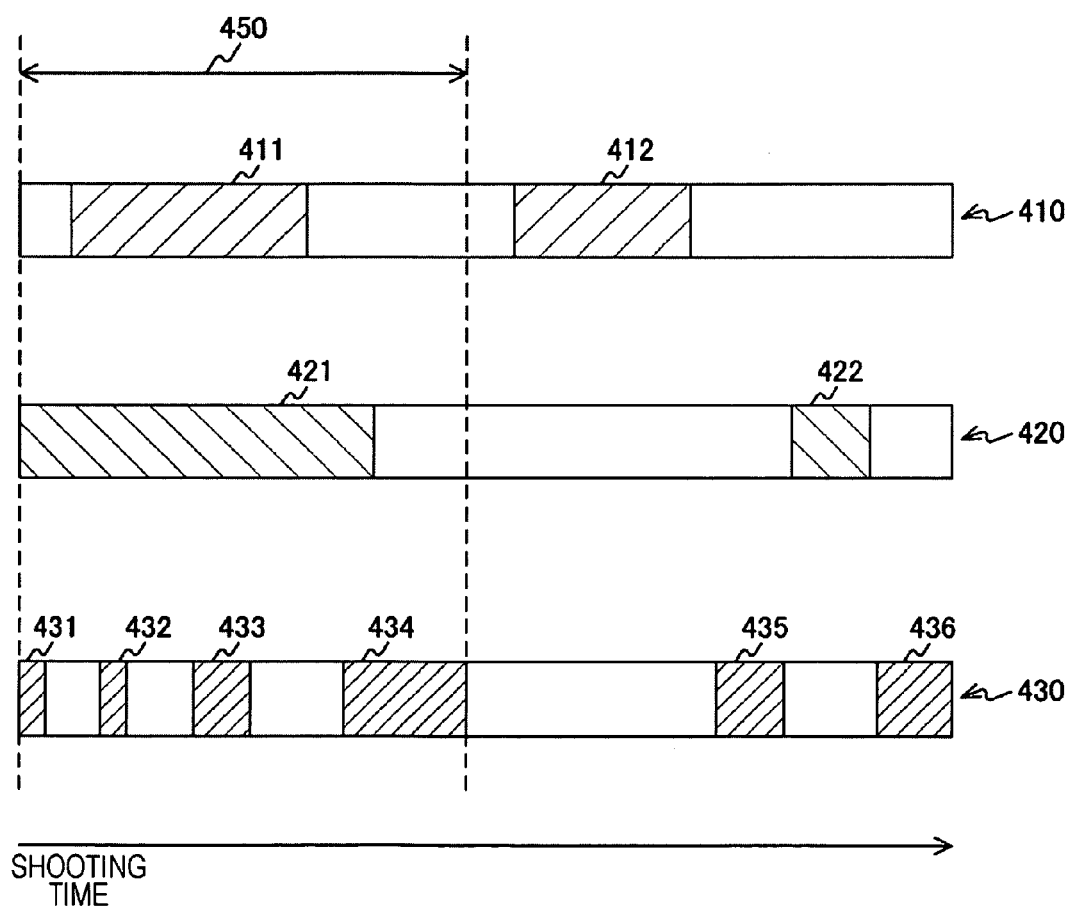
FIG. 3 is a diagram schematically showing three moving image sets 410, 420, and 430 arranged in time series.

FIG. 3 schematically shows three moving image sets 410, 420, and 430 arranged in time series. In this case, the moving image sets 410, 420, and 430 are obtained by shooting the same event at different angles by three persons. Each moving image set includes a plurality of moving images. Specifically, the moving image set 410 includes a plurality of moving images 411 and 412 obtained by shooting the event for periods. The moving image set 420 includes a plurality of moving images 421 and 422 obtained by shooting the event for periods. The moving image set 430 includes a plurality of moving images 431 to 436 obtained by shooting the event for periods. In FIG. 3, those moving images 411, 412, 421, 422, and 431 to 436 are plotted against shooting time. Recording portions in which the respective moving images are recorded are indicated by hatching.

Referring to FIG. 3, when there are the moving images 411, 412, 421, 422, and 431 to 436 obtained by shooting the same event by different persons, a shooting section corresponding to an exciting scene is extracted from those moving images. For example, a shooting section corresponding to an exciting scene can be extracted on the basis of the presence or absence of moving images captured by a predetermined number of persons or more for a period. For instance, a shooting section in which a plurality of moving images overlap with respect to shooting time is extracted and whether the number of moving images in the shooting section is equal to or greater than N is determined. When N or more moving images are present in the shooting section, the shooting section can be extracted as a section corresponding to an exciting scene. In this instance, N is an integer greater than or equal to 2. The user can set any value as N. For example, when N is set to a relatively high value, a digest image of scenes shot by many persons can be generated. On the other hand, when N is set to a relatively low value, a scene shot by few persons can be covered for digest generation. In the present embodiment, it is assumed that N=2.

Referring to FIG. 3, the moving images 411, 421, and 431 to 434 overlap with respect to the shooting time for the same period, i.e., two or more moving images overlapping with respect to the shooting time are present for this period. Accordingly, a section including those moving images is extracted as a shooting section 450 corresponding to an exciting scene. The moving images 412, 422, 435, and 436 do not overlap with respect to the shooting time. Accordingly, an exciting scene is not extracted from a section including those moving images.

A method of calculating a digest score from moving images included in a shooting section corresponding to an exciting scene will now be described in detail with reference to FIG. 4.

Figure 4:
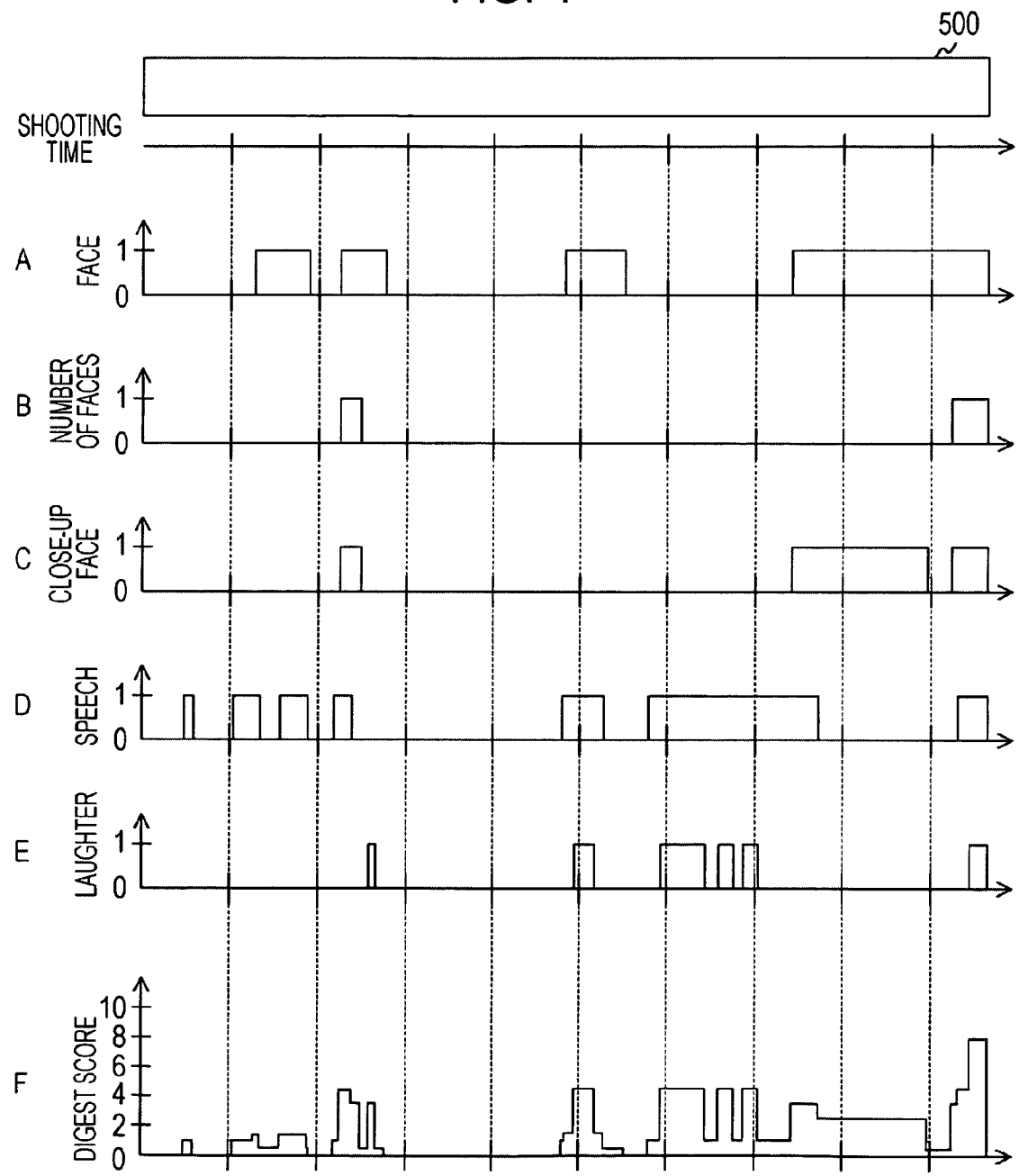
FIG. 4 shows an example of the amounts of features extracted from a moving image 500 and a digest score calculated on the basis of the feature amounts.

FIG. 4 shows an example of feature amounts extracted from a moving image 500 and a digest score calculated on the basis of the feature amounts. It is assumed that the moving image 500 is included in a shooting section corresponding to an exciting scene.

Part A of FIG. 4 is a graph showing a feature amount indicative of the presence or absence of a face included in the moving image 500. Part B of FIG. 4 is a graph showing a feature amount indicative of the number of faces included in the moving image 500. Part C of FIG. 4 is a graph showing a feature amount indicative of the presence or absence of a close-up face included in the moving image 500. Part D of FIG. 4 is a graph showing a feature amount indicative of the presence or absence of speech (conversation) included in the moving image 500. Part E of FIG. 4 is a graph showing a feature amount indicative of the presence or absence of laughter included in the moving image 500. The graphs in parts A to E of FIG. 4 each show the amount of feature plotted against shooting time. In the following description, it is assumed that an extracted feature amount is indicated at a value "1" or "0" in those graphs. Extracted feature amounts may have continuous values other than "1" and "0".

Referring to FIG. 4, a feature amount in part A indicates the presence or absence of a face included in a moving image segment. For example, when a moving image segment includes a face, a value "1" is recorded as a feature amount. Whereas, when the moving image segment includes no face, a value "0" is recorded as a feature amount.

A feature amount in part B indicates the number of faces included in a moving image segment. For example, when the number of faces included in a moving image segment is relatively small, a value "1" is recorded as a feature amount. When the number of faces included in the moving image segment is relatively large, a value "0" is recorded as a feature amount.

A feature amount in part C indicates whether a face included in a moving image segment is in close-up. For example, when a face included in a moving image segment is in close-up (i.e., a face displayed on a screen is relatively large), a value "1" is recorded as a feature amount. When a face included in the moving image segment is not in close-up, a value "0" is recorded as a feature amount.

A feature amount in part D indicates whether a moving image segment includes speech. For example, when a moving image segment includes speech (i.e., audio data related to the moving image segment contains speech), a value "1" is recorded as a feature amount. When the moving image segment includes no speech, a value "0" is recorded as a feature amount.

A feature amount in part E indicates whether a moving image segment includes laughter. For example, when a moving image segment includes laughter (i.e., audio data related to the moving image segment contains laughter), a value "1" is recorded as a feature amount. When the moving image segment includes no laughter, a value "0" is recorded as a feature amount.

As shown in parts A to E of FIG. 4, in order to extract feature amounts of a moving image, audio data and video data of the moving image are analyzed in time series, and feature amounts are extracted and recorded in time series on the basis of the analysis of the audio and video data sets. As for the analysis of audio and video data sets, various known analyzing methods are available. Another method of extracting feature amounts may be used.

In the present embodiment of the present invention, "the presence or absence of a face included in a moving image", "the number of faces included therein", "the presence or absence of a close-up face included therein", "the presence or absence of speech (conversation) included therein", and "the presence or absence of laughter included therein" are used as feature amounts extracted from the moving image. Another feature amount may be extracted from the moving image. For example, "scene change", "the position of a face", "the orientation of a face", "camera work (pan, tilt, or zoom)", "sound volume", "person in a moving image", and "thing in a moving image" may be used as feature amounts extracted from the moving image.

Part F of FIG. 4 is a graph showing a digest score, serving as a value obtained on the basis of the respective feature amounts shown in parts A to E of FIG. 4. The graph in part F of FIG. 4 shows a digest score plotted against shooting time.

The digest score is obtained by multiplying the feature amounts in parts A to E of FIG. 4 by respective weights and adding the resultant values.

For example, a weight for a feature amount FS indicative of "the presence or absence of a face included in a moving image" is set to "0.5", a weight for a feature amount FN indicative of "the number of faces included therein" is set to "1.0", a weight for a feature amount FZ indicative of "the presence or absence of a close-up face included therein" is set to "2.0", a weight for a feature amount SP indicative of "the presence or absence of speech (conversation) included therein" is set to "1.0", and a weight for a feature amount SM indicative of "the presence or absence of laughter included therein" is set to "3.0". A digest score DS can be obtained using the following equation.

$$DS=FS\times 0.5+FN\times 1.0+FZ\times 2.0+SP\times 1.0+SM\times 3.0$$

Part F of FIG. 4 shows an example of a digest score calculated using the above-described equation. In this instance, weights used for calculation of a digest score will now be described below. Each weight is a factor indicating how much the corresponding feature amount contributes to an exciting video scene. In this case, a weight to a section including laughter is set to "3.0" and a weight to a section including a close-up face is set to "2.0". In other words, those weights are set to high values. This setting is based on an experimental rule that a video scene including laughter and a video scene including a person in close-up are often "interesting" or "exciting". Alternatively, parameters obtained by a statistical learning method including the following steps (1) to (3) may be used as weights.

(1) The user manually marks a scene expected to be exciting while viewing a captured moving image.

(2) The correlation between each feature amount associated with each scene marked by the user and the marking position is obtained.

(3) Among the feature amounts, a feature amount having high correlation with each scene marked by the user is determined as a feature amount that is of deep concern to the user and contributes significantly to a digest image. A weight to the feature amount is set to a relatively high value.

Those weights may be updated by feedback from the user. For example, a "positive button" and a "negative button" are provided for the operation reception unit 190 so that the user is allowed to press the "positive button" or the "negative button" during or after playback of a digest image generated by the digest-image generation unit 160. When the user presses either of the buttons, feedback regarding the digest image can be obtained from the user. For instance, when the user presses the "positive button" during playback of a portion, including laughter, of the digest image, a weight to a feature amount indicative of "the presence or absence of laughter included in a moving image" is set to a high value. For example, when the user presses the "negative button" during playback of a portion, including many faces, of the digest image, a weight to a feature amount indicative of "the number of faces included in a moving image" is set to a low value. As described above, weights may be personalized in accordance with feedback from the user.

Furthermore, the user may input values of respective weights through the operation reception unit 190 so as to set the weights according to the user's preference.

Figure 5:
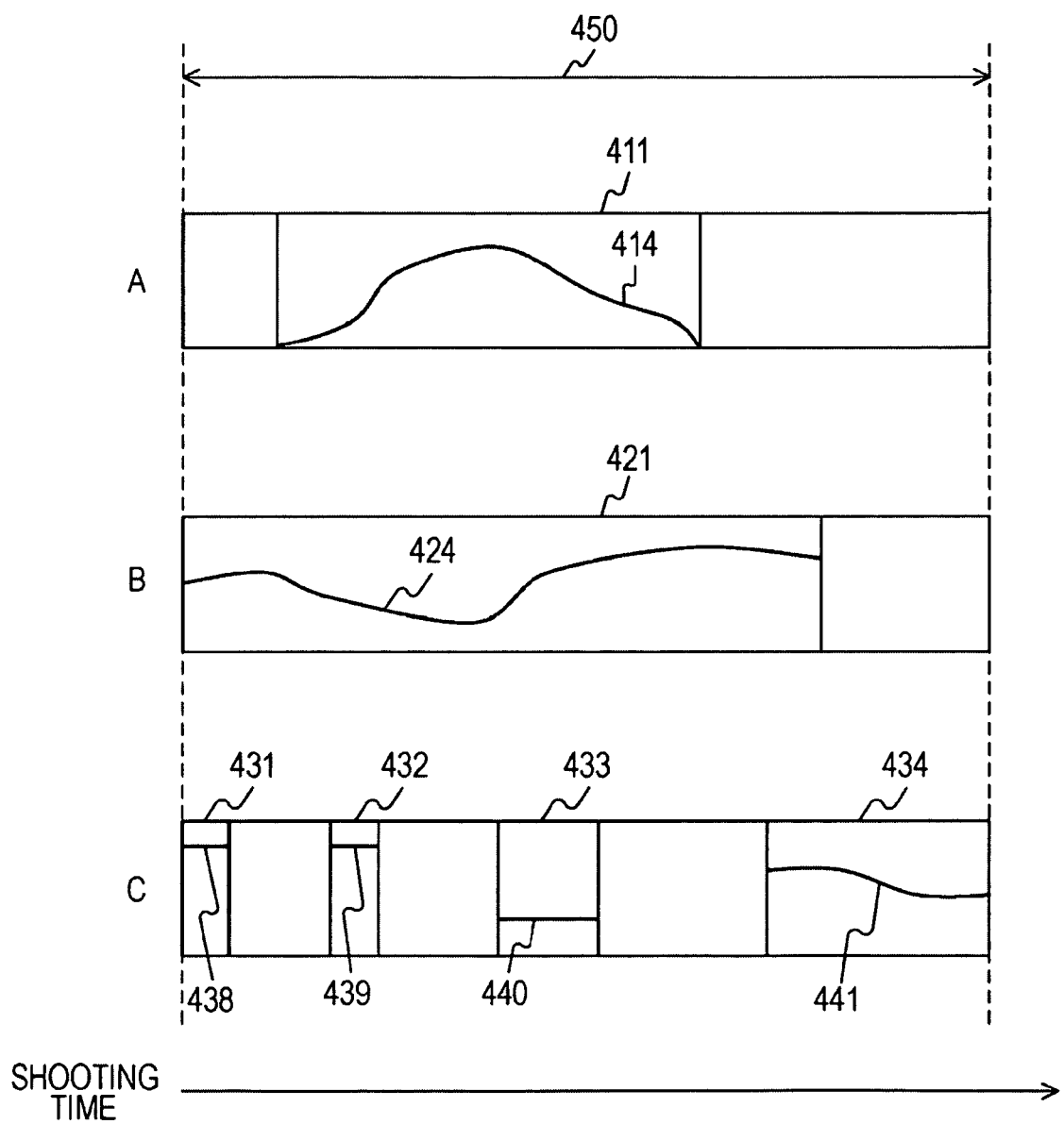
FIG. 5 illustrates moving images 411, 421, and 431 to 434 included in a shooting section 450.

FIG. 5 shows the moving images 411, 421, and 431 to 434 which are included in the shooting section 450 and are extracted from the moving image sets 410, 420, and 430 shown in FIG. 3. Referring to FIG. 5, a recording portion of each moving image includes a graph showing a digest score calculated on the moving image. For example, in part A of FIG. 5, a graph 414 shows a digest score calculated on the moving image 411. In part B of FIG. 5, a graph 424 shows a digest score calculated on the moving image 421. In part C of FIG. 5, graphs 438 to 441 show digest scores calculated on the moving images 431 to 434, respectively.

As shown in parts A to C of FIG. 5, the digest scores are calculated on the moving images 411, 421, and 431 to 434, extracted from the moving image sets 410, 420, and 430, in the shooting section 450 using the calculation method described with reference to FIG. 4.

Figure 6:
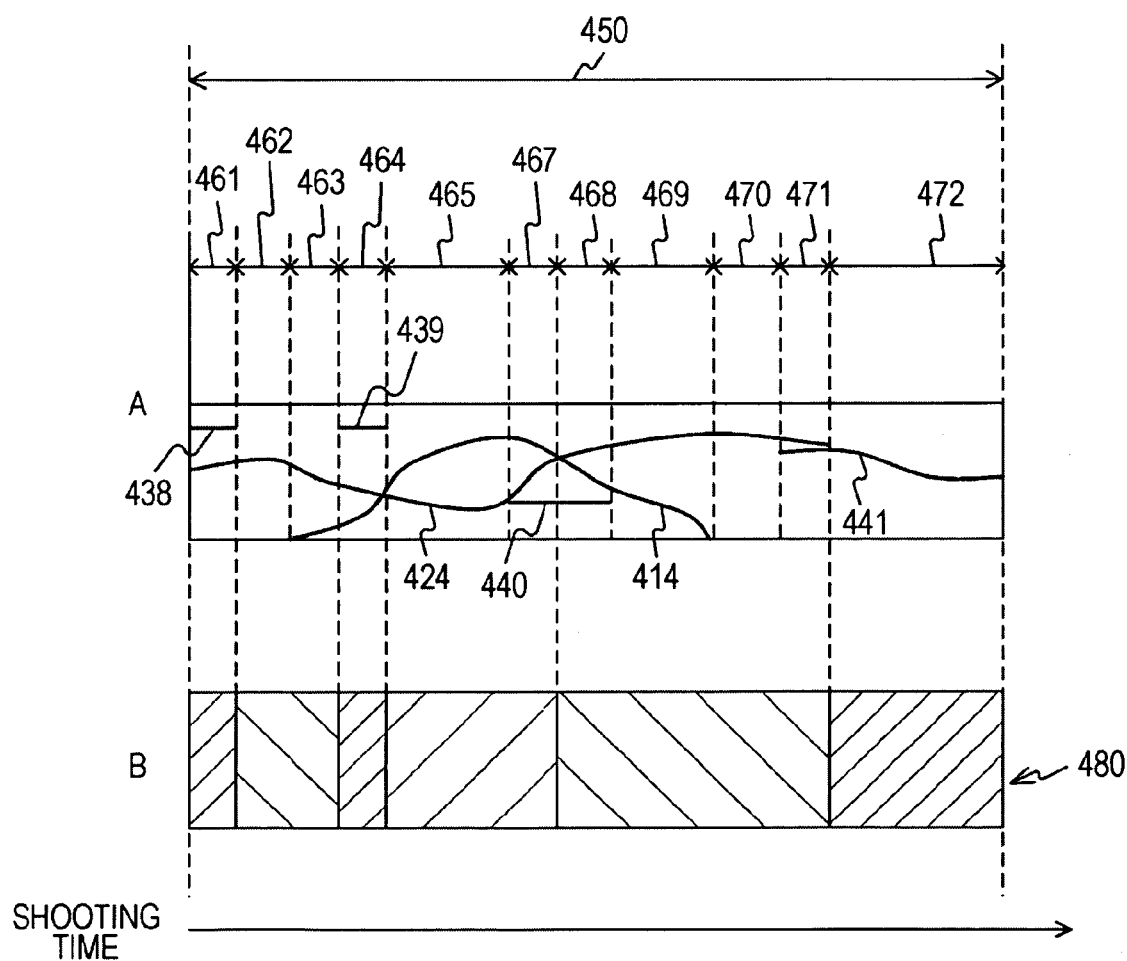
FIG. 6 shows digest scores of respective moving images in the shooting section 450 and a digest image 480 generated on the basis of the digest scores.

FIG. 6 shows a graph showing the digest scores calculated on the moving images 411, 421, and 431 to 434 included in the shooting section 450 shown in FIG. 5, and further illustrates a digest image 480 generated on the basis of the digest scores. Part A of FIG. 6 shows the superimposed graphs 414, 424, and 438 to 441 shown in parts A to C of FIG. 5. Part B of FIG. 6 shows the digest image 480 based on the results of comparison among the graphs 414, 424, and 438 to 441 shown in part A of FIG. 6.

Referring to part A of FIG. 6, in each of shooting section segments 461, 463 to 469, and 471, a plurality of graphs are superimposed for the same period. In other words, in each of the shooting section segments 461, 463 to 469, and 471, a plurality of moving images overlap for the same period. As described above, in a shooting section, such as the shooting section 450, where a plurality of moving images overlap, digest scores of respective moving images included in each shooting section segment are compared and the moving image with the highest digest score is selected.

For example, the shooting section segment 461 includes part or the whole of the moving images 421 and 431 (refer to FIG. 3). Referring to part A of FIG. 6, the graph 438 related to the moving image 431 is higher than the graph 424 related to the moving image 421. Accordingly, a digest score of the image related to the graph 438 is greater than that of the image related to the graph 424. Accordingly, the whole of the moving image 431 related to the graph 438 is selected as a digest image segment in the shooting section segment 461.

Similarly, in the shooting section segment 463 where two moving images overlap, part of the moving image 421 related to the graph 424 is selected as a digest image segment. In the shooting section segment 464 where three moving images overlap, the whole of the moving image 432 related to the graph 439 is selected as a digest image segment. In the shooting section segment 465 where two moving images overlap, part of the moving image 411 related to the graph 414 is selected as a digest image segment. In the shooting section segment 467 where three moving images overlap, part of the moving image 411 related to the graph 414 is selected as a digest image segment. In the shooting section segment 468 where three moving images overlap, part of the moving image 421 related to the graph 424 is selected as a digest image segment. In the shooting section segment 469 where two moving images overlap, part of the moving image 421 related to the graph 424 is selected as a digest image segment. In the shooting section segment 471 where two moving images overlap, part of the moving image 421 related to the graph 424 is selected as a digest image segment.

In each of shooting section segments 462, 470, and 472 with no overlap between a plurality of moving images, a moving image included in the shooting section segment is selected as a digest image segment.

By editing parts or the whole of the moving images selected in the shooting section 450 by comparing the digest scores as described above, the digest image 480 is generated as shown in part B of FIG. 6. In part B of FIG. 6, respective hatched portions in the digest image 480 correspond to the moving image sets 410, 420, and 430 shown in FIG. 3. As shown in part B of FIG. 6, when a plurality of moving images are recorded in a shooting section, part of any moving image is used to generate a digest image.

As described above, a plurality of moving images obtained by shooting the same scene at different angles by persons can be edited and played on the basis of shooting times and feature amounts. Consequently, the user can play a digest image, serving as an edited image obtained by sampling good parts, without performing a complicated operation for editing the moving images obtained by shooting the same scene at different angles by persons.

An operation of the image processing apparatus 100 according to the present embodiment of the present invention will now be described with reference to FIG. 7.

Figure 7:
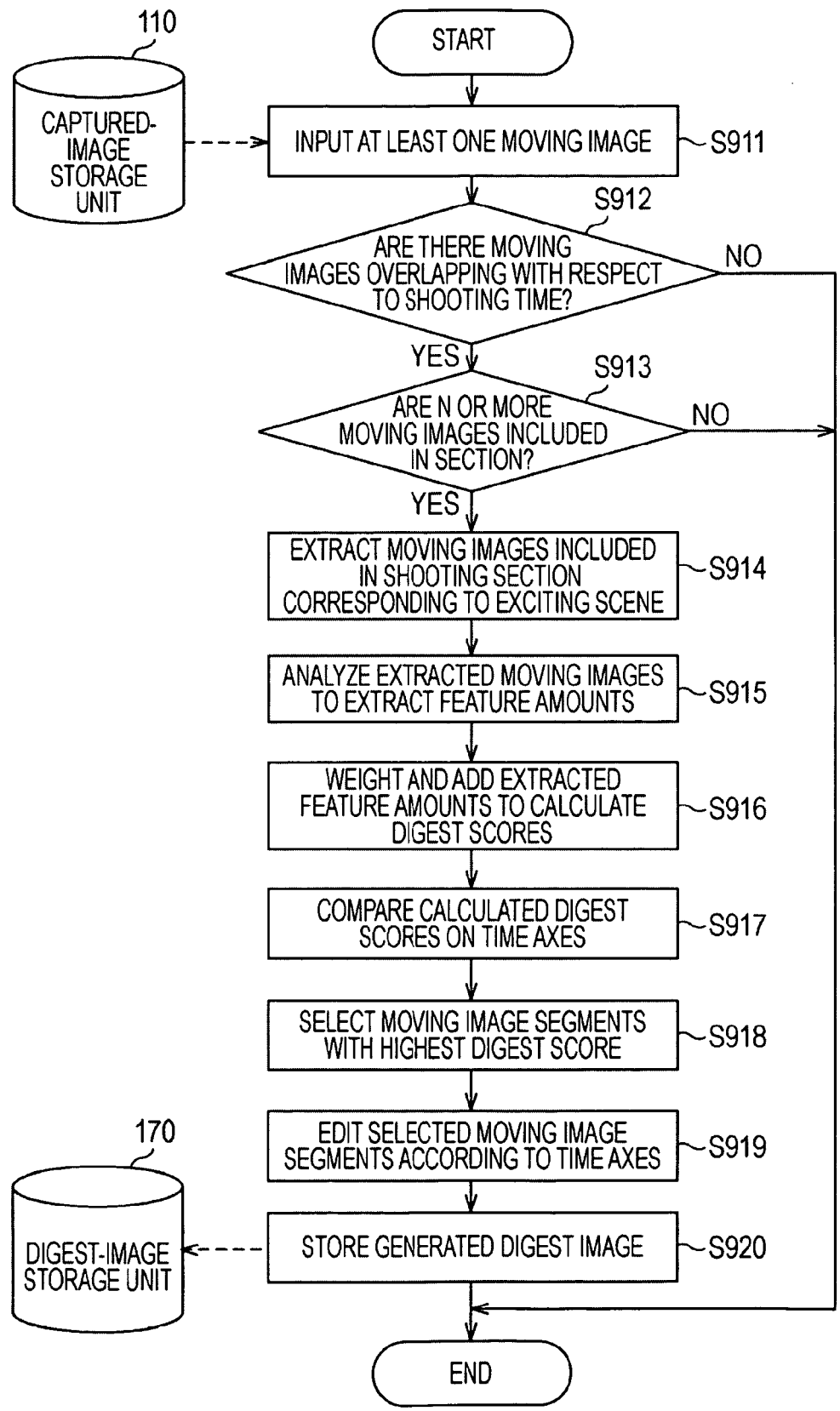
FIG. 7 is a flowchart of a digest image generation process by the image processing apparatus 100.

FIG. 7 is a flowchart of a digest image generation process by the image processing apparatus 100.

First, a moving image stored in the captured-image storage unit 110 is input (step S911). The input moving image is at least one moving image.

Subsequently, whether there are moving images overlapping with respect to shooting time as input moving images is determined (step S912). When there are not moving images overlapping with respect to the shooting time (NO in step S912), the fact means that there are not moving images subjected to digest-image generation processing. Therefore, the digest image generation process is terminated. For example, as for the moving image sets 410, 420, and 430 shown in FIG. 3, at least the moving images 411, 421, and 431 to 434 overlap with respect to the shooting time. On the other hand, the moving images 412, 422, 435, and 436 do not overlap with respect to the shooting time.

When there are moving images overlapping with respect to the shooting time as input moving images (YES in step S912), whether N or more moving images are present in a section that includes the moving images overlapping with respect to the shooting time is determined (step S913). In this case, it is assumed that N=2. For example, as for the moving image sets 410, 420, and 430 shown in FIG. 3, two or more moving images are present in the shooting section 450 which includes the moving images 411, 421, and 431 to 434 overlapping with respect to the shooting time. When N or more moving images are not present in the section that includes the moving images overlapping with respect to the shooting time (NO in step S913), the fact means that there are not moving images subjected to digest image generation processing. Accordingly, the digest image generation process is terminated.

When N or more moving images are present in the section that includes the moving images overlapping with respect to the shooting time (YES in step S913), the moving images included in the section, serving as a shooting section corresponding to an exciting scene, are extracted (step S914). For example, as for the moving image sets 410, 420, and 430 shown in FIG. 3, the moving images 411, 421, and 431 to 434 are extracted.

Subsequently, feature amounts are extracted from each extracted moving image (step S915). For example, feature amounts are extracted from each moving image in time series, as shown in parts A to E of FIG. 4. After that, the extracted feature amounts are weighted and added, so that a digest score of each moving image is calculated in time series (step S916). For example, a digest score of each moving image is calculated as shown in part F of FIG. 4.

The calculated digest scores of the respective moving images are compared on time axes of the shooting time (step S917). For example, the digest scores calculated on the moving images 411, 421, and 431 to 434, as shown in FIG. 5, are compared on time axes of the shooting time, as shown in part A of FIG. 6.

Subsequently, a moving image segment with the highest digest score is selected in each segment of the shooting section corresponding to the exciting scene on the basis of the results of comparison between the digest scores of the respective moving images (step S918). For example, as shown in part A of FIG. 6, a moving image segment with the highest digest score is selected in each of the segments 461 to 472 of the shooting section 450 on the basis of the results of comparison between the digest scores.

After that, the selected moving image segments are read from the captured-image storage unit 110 and the read moving image segments are arranged along the time axes of the shooting time, thus generating a digest image (step S919). For example, as shown in part A of FIG. 6, the moving image segments selected on the basis of the results of comparison in the respective segments 461 to 472 of the shooting section 450 are combined into the digest image 480, as shown in part B of FIG. 6.

The generated digest image is stored into the digest-image storage unit 170 (step S920).

An image processing system including the image processing apparatus according to the above-described embodiment of the present invention will now be described in detail with reference to FIG. 3.

Figure 8:
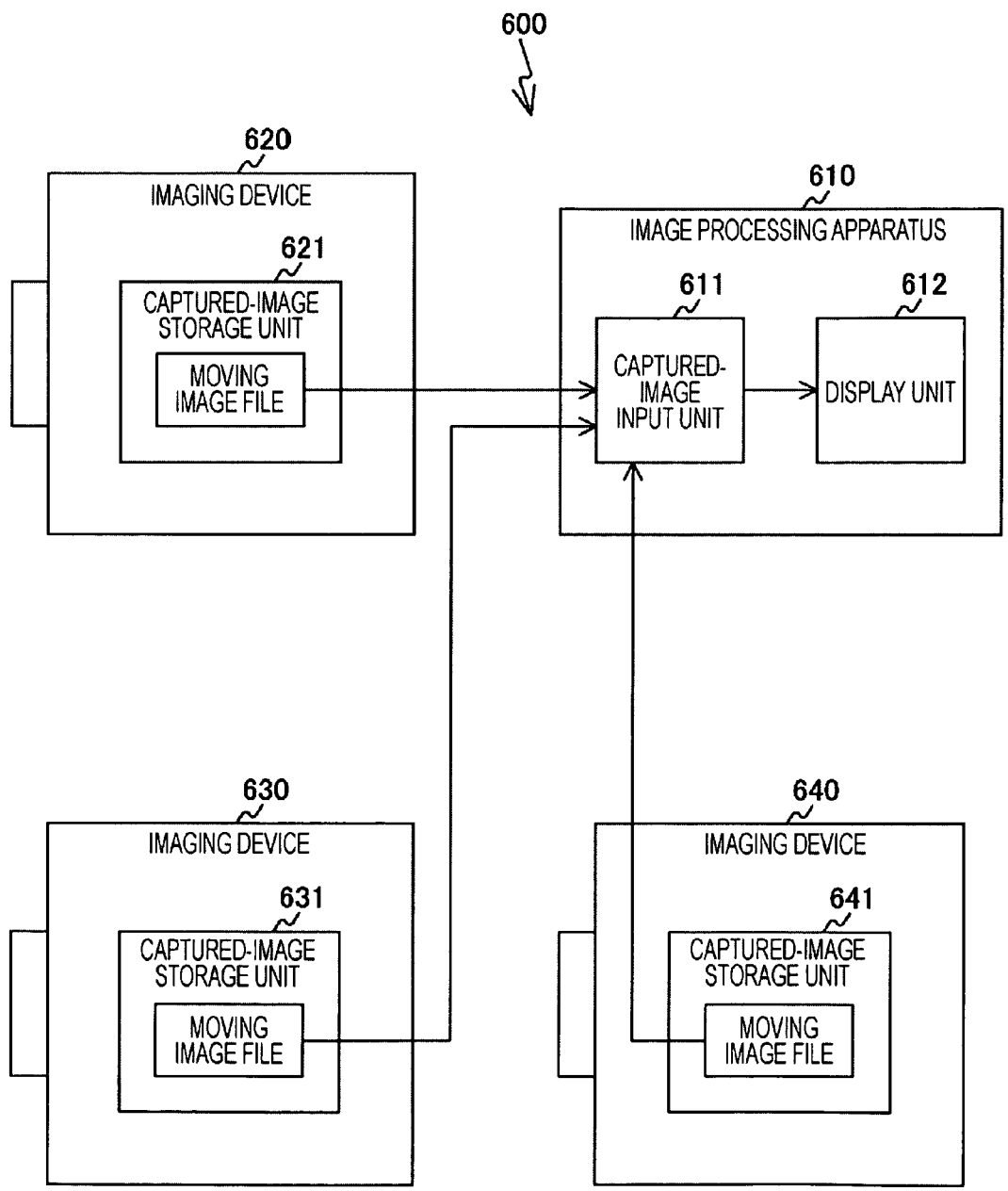
FIG. 8 is a diagram showing the structure of an image processing system 600.

FIG. 8 illustrates the structure of an image processing system 600 according to an embodiment of the present invention. The image processing system 600 includes an image processing apparatus 610 and imaging devices 620, 630, and 640.

The imaging devices 620, 630, and 640 are image recording apparatuses, such as digital video cameras. The imaging devices 620, 630, and 640 store captured moving images into captured-image storage units 621, 631, and 641, respectively.

The image processing apparatus 610 is obtained by partially modifying the image processing apparatus 100 according to the foregoing embodiment of the present invention. The image processing apparatus 610 includes a plurality of connection terminals (not shown) for connection with at least one imaging device. A moving image is supplied from any imaging device to a captured-image input unit 611 through any connection terminal. In this case, the image processing apparatus 610 is connected to the imaging devices 620, 630, and 640 through interfaces, such as universal serial buses (USB) cables, respectively. As for the interfaces, a wireless interface, such as ultra wide band (UWB), may be used in addition to a wired cable, such as a USB cable.

The image processing apparatus 610 is an image reproducing apparatus capable of reading moving images stored in the captured-image storage units 621, 631, and 641 of the imaging devices 620, 630, and 640 connected to the apparatus 610 through the interfaces, respectively, and displaying the read moving images on a display unit 612 so as to play the moving images. In addition, the image processing apparatus 610 generates a digest image of the moving images read from the respective imaging devices 620, 630, and 640 in a manner similar to the image processing apparatus 100 and displays the generated digest image on the display unit 612.

Figure 9:
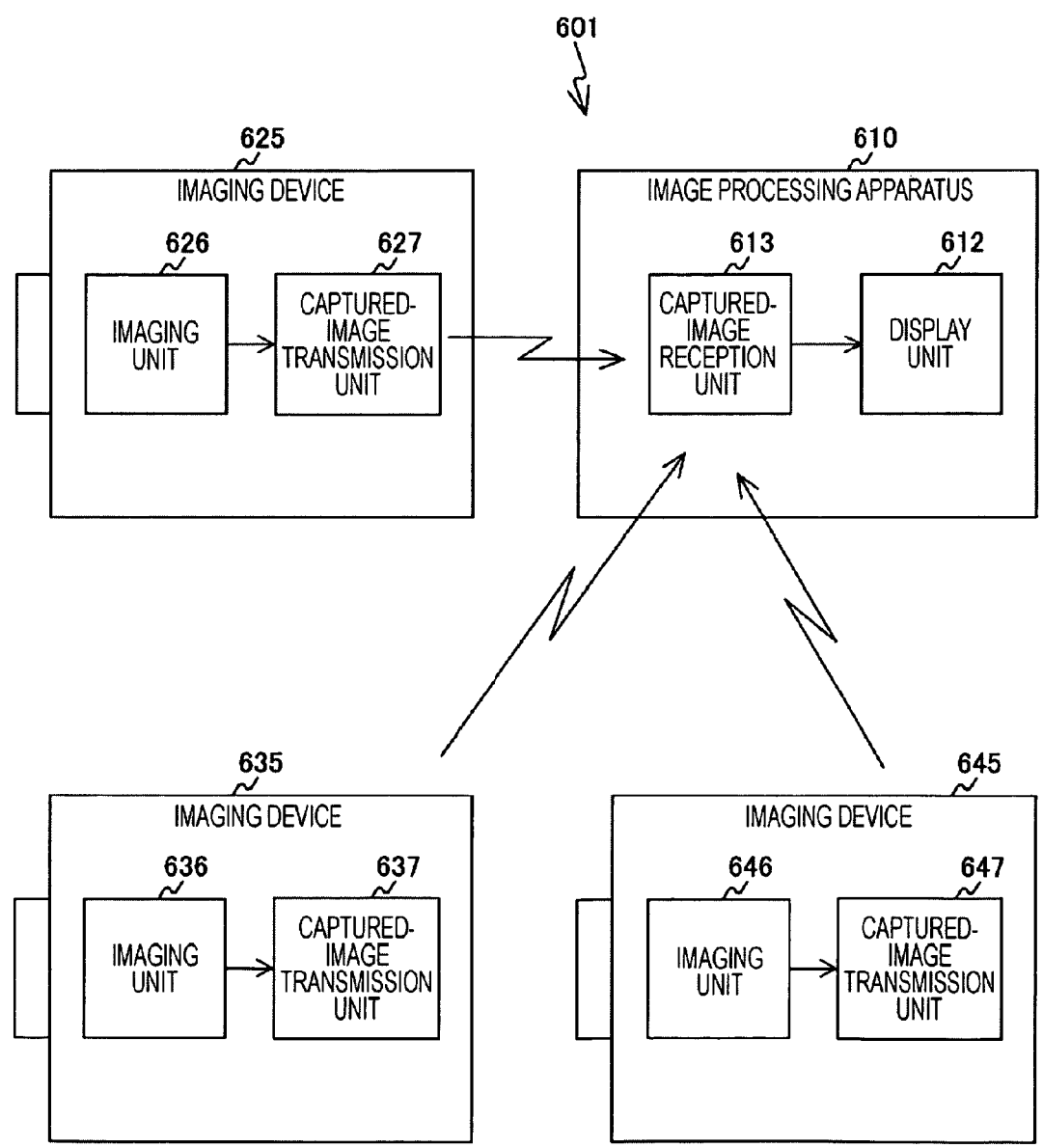
FIG. 9 is a diagram showing the structure of an image processing system 601.

FIG. 9 shows the structure of an image processing system 601 according to another embodiment of the present invention. The image processing system 601 includes an image processing apparatus 610 and imaging devices 625, 635, and 645.

The imaging devices 625, 635, and 645 are image recording apparatuses, such as digital video cameras. The imaging devices 625, 635, and 645 transmit moving images, captured by respective imaging units 626, 636, and 646, to the image processing apparatus 610 through captured-image transmission units 627, 637, and 647, respectively. This embodiment will be described with respect to a case where the captured-image transmission units 627, 637, and 647 transmit moving images to the image processing apparatus 610 by wireless. The present embodiment may be applied to a case where moving images are transmitted over a wire circuit.

The image processing apparatus 610 is obtained by providing a captured-image reception unit 613 for the image processing apparatus 610 shown in FIG. 8. The image processing apparatus 610 is an image reproducing apparatus capable of receiving moving images transmitted from the imaging devices 625, 635, and 645 through the captured-image reception unit 613 and displaying the received moving images on a display unit 612 so as to play the moving images. In addition, the image processing apparatus 610 stores a plurality of moving images transmitted from the imaging devices 625, 635, and 645, generates a digest image of those moving images in a manner similar to the image processing apparatus 610 in FIG. 8, and displays the digest image on the display unit 612. As described above, the present embodiment of the present invention can be applied to a case where a storage unit is not provided for each imaging device and the imaging devices transmit captured images to an image processing apparatus.

Figure 10:
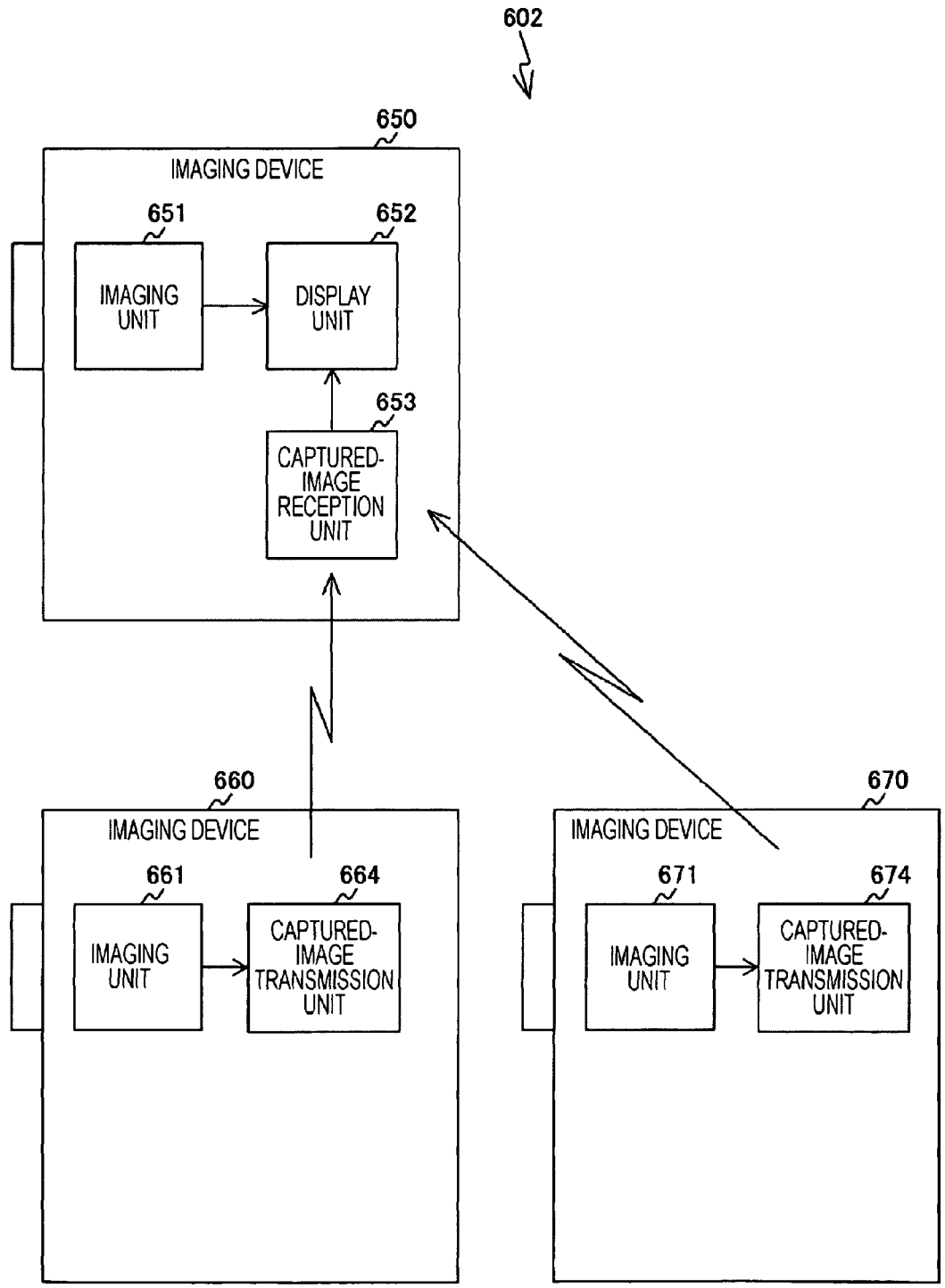
FIG. 10 is a diagram showing the structure of an image processing system 602.

FIG. 10 illustrates the structure of an image processing system 602 according to another embodiment of the present invention. The image processing system 602 includes imaging devices 650, 660, and 670.

The imaging devices 650, 660, and 670 are image recording apparatuses, such as digital video cameras, and are each obtained by partially modifying the image processing apparatus 100 according to the foregoing embodiment of the present invention. The imaging devices 650, 660, and 670 are connected to each other in an ad hoc manner by wireless. In other words, each of the imaging devices 650, 660, and 670 can generate a digest image and display the digest image in a manner similar to the image processing apparatus 610 in FIG. 8. The present embodiment will be described with respect to a case where moving images captured through imaging units 661 and 671 of the respective imaging devices 660 and 670 are transmitted to the imaging device 650 through captured-image transmission units 664 and 674. The present embodiment can be applied to a case where other imaging devices transmit and receive moving images to/from each other.

For example, the imaging device 650 can receive the moving images, transmitted from the imaging devices 660 and 670, through a captured-image reception unit 653 and display the received moving images on a display unit 652 so as to play the moving images. In addition, the imaging device 650 stores the moving images transmitted from the imaging devices 660 and 670, generates a digest image of the moving images, and displays the digest image on the display unit 652 in a manner similar to the image processing apparatus 610 in FIG. 8. The present embodiment of the present invention can be applied to a case where images captured by a plurality of imaging devices ad-hoc connected to each other by wireless are transmitted to one imaging device by wireless.

As described above, according to the above-described embodiments of the present invention, the shooting-section extraction unit 120 extracts a shooting section corresponding to a so-called exciting scene, the digest-score calculation unit 140 calculates digest scores of moving images included in the shooting section, the digest-image selection unit 150 compares the digest scores to select moving image segments most suitable for viewing, and the digest-image generation unit 160 edits the selected moving image segments.

Consequently, a large number of moving images simultaneously captured by a plurality of users can be effectively edited and viewed. When a digest image is first viewed, the whole of the many moving images can be rapidly grasped. Accordingly, the digest image can encourage a user to view the large number of moving images. For example, as for a wedding reception, a digest image generated by sampling good parts of moving images, obtained by shooting the wedding reception by different persons, can be viewed. As for an athletic meet, a relay race scene captured at various points of view can be easily viewed.

A modification of the foregoing embodiment of the present invention will now be described with reference to FIG. 11.

Figure 11:
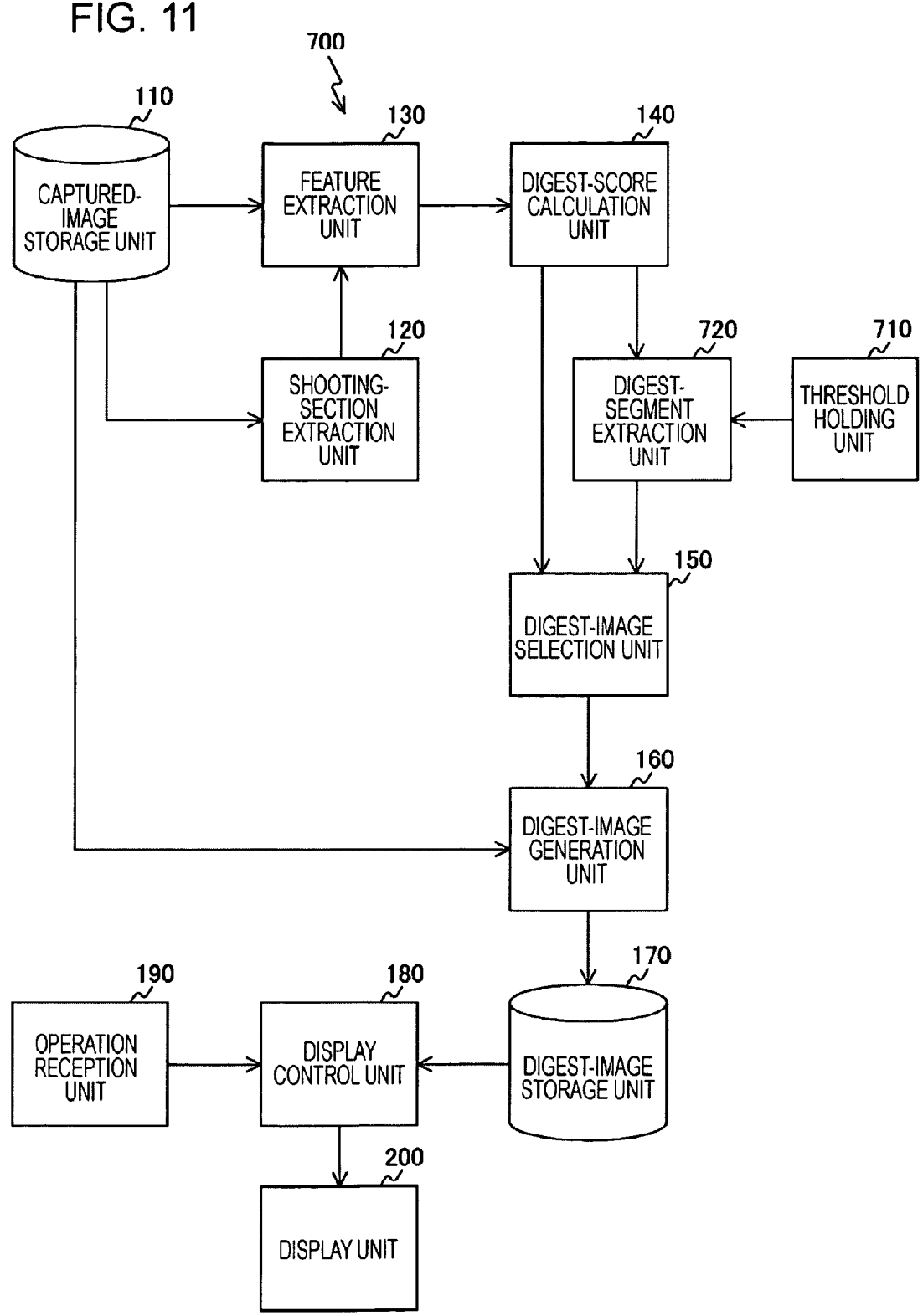
FIG. 11 is a block diagram showing the functional structure of an image processing apparatus 700.

FIG. 11 is a block diagram showing the functional structure of an image processing apparatus 700 according to the modification of the foregoing embodiment of the present invention. The image processing apparatus 700 includes a captured-image storage unit 110, a shooting-section extraction unit 120, a feature extraction unit 130, a digest-score calculation unit 140, a digest-image selection unit 150, a digest-image generation unit 160, a digest-image storage unit 170, a display control unit 180, an operation reception unit 190, a display unit 200, a threshold holding unit 710, and a digest-segment extraction unit 720. In the image processing apparatus 700, the components other than the digest-image selection unit 150, the threshold holding unit 710, and the digest-segment extraction unit 720 are the same as those of the image processing apparatus 100. Accordingly, a description of the same components will be omitted.

The threshold holding unit 710 holds a threshold used for threshold processing a digest score calculated on the basis of respective feature amounts of a moving image. For example, the threshold holding unit 710 holds a threshold of "4.0"

The digest-segment extraction unit 720 extracts a section segment (also referred to as a digest segment), corresponding to a digest score at or above the threshold held by the threshold holding unit 710, from each of moving images included in a shooting section extracted by the shooting-section extraction unit 120. The digest-segment extraction unit 720 outputs extracted section segments to the digest-image selection unit 150. The extraction of section segments will be described in detail later with reference to FIG. 12.

The digest-image selection unit 150 compares, in time series, digest scores of the respective moving images calculated by the digest-score calculation unit 140 in the section segments extracted by the digest-segment extraction unit 720, thus extracting a moving image segment with the highest digest score in each of the section segments.

FIG. 12 shows feature amounts extracted from the moving image 500, a digest score calculated on the basis of the feature amounts, and an example of section segments in the moving image 500 extracted on the basis of the digest scores and a threshold. Parts A to E of FIG. 12 are the same as those of FIG. 4. Accordingly, a description of those parts will be omitted.

In part F of FIG. 12, a graph shows a digest score obtained on the basis of the feature amounts shown in parts A to E of FIG. 12. The graph is the same as that shown in part F of FIG. 4. In part F of FIG. 12, the graph shows the digest score plotted against shooting time.

In the foregoing embodiment of the present invention, a digest image is generated using all of digest scores calculated on the basis of the feature amounts of respective moving images included in a shooting section extracted by the shooting-section extraction unit 120. According to this modification, digest scores calculated on the basis of feature amounts of respective moving images are subjected to threshold processing, and digest scores at or above a threshold are used to generate a digest image.

As shown in part F of FIG. 12, the digest-image selection unit 150 selects part or the whole of any of moving images in each of section segments corresponding to digest scores at or above a threshold 711 held by the threshold holding unit 710.

Part G of FIG. 12 shows section segments 721 to 726, corresponding to digest scores at or above the threshold 711, plotted against the shooting time. The section segments corresponding to the digest scores at or above the threshold 711 are indicated by hatching. As described above, digest scores of respective moving images calculated by the digest-score calculation unit 140 are compared in time series in each of the section segments 721 to 726 corresponding to the digest scores at or above the threshold 711. A moving image segment with the highest digest score is selected in each section segment.

The modification has been described with respect to a case where the fixed value "4.0" is used as a threshold. A threshold may be adjusted in accordance with a distribution of digest scores of moving images. For example, a threshold may be set in each section segment so that digest scores ranked in the top 10 percent of calculated digest scores are selected in each section segment. Alternatively, the user may input a threshold according to the user's preference through the operation reception unit 190.

According to the modification of the foregoing embodiment of the present invention, moving image segments suitable for viewing are selected using a threshold held by the threshold holding unit 710, thus generating a digest image including shorter moving image segments. Consequently, a large amount of moving images simultaneously captured by users can be effectively edited so that the moving images can be viewed more rapidly.

The above-described embodiments and modification of the present invention have been described with respect to moving images. The embodiments of the present invention can be applied to images, such as photographs, captured successively. In addition, typical thumbnail images may be extracted from moving image segments in respective segments (e.g., the shooting section segments 461 to 472 in FIG. 6) constituting a generated digest image. The typical thumbnail images may be displayed in time series before playback of the digest image.

The embodiments of the present invention have been described with respect to the image processing apparatuses. The embodiments of the present invention can be applied to an image display apparatus, such as a portable terminal, and an imaging device, such as a digital still camera, which are capable of inputting a plurality of images and displaying the input images.

The embodiments of the present invention are examples for embodying the present invention. Although there is the correspondence between the features of the claims and the specific elements in each embodiment of the present invention, as will be described later, the present invention is not limited to the embodiments. It should be understood by those skilled in the art that various modifications, combinations, sub-combinations and alterations may occur depending on design requirements and other factors insofar as they are within the scope of the appended claims or the equivalents thereof.

The image processing apparatus 100, the image processing apparatus 610, or the image processing apparatus 700 corresponds to, for example, an image processing apparatus according to a first or second embodiment of the present invention.

The captured-image storage unit 110 corresponds to, for example, an image storing section according to the first embodiment of the present invention.

The feature extraction unit 130 corresponds to, for example, a feature extracting section according to the first or second embodiment of the present invention. The digest-image selection unit 150 corresponds to, for example, an image selecting section according to the first or second embodiment of the present invention. The digest-image generation unit 160 corresponds to, for example, a digest-image generating section according to the first or second embodiment of the present invention.

The digest-score calculation unit 140 corresponds to, for example, a digest-score calculating section according to the first embodiment of the present invention.

The shooting-section extraction unit 120 corresponds to, for example, an overlap-shooting-section extracting section according to the first embodiment of the present invention.

The threshold holding unit 710 corresponds to, for example, a threshold holding section according to the first embodiment of the present invention. The digest-segment extraction unit 720 corresponds to, for example, a digest-segment extracting section according to the first embodiment of the present invention.

The captured-image input unit 611 corresponds to, for example, an image input section according to the second embodiment of the present invention.

Step S915 corresponds to, for example, a feature extracting step according to a third or fourth embodiment of the present invention. Step S918 corresponds to, for example, an image selecting step according to the third or fourth embodiment of the present invention. Step S919 corresponds to, for example, a digest-image generating step according to the third or fourth embodiment of the present invention.

Processing steps described in the foregoing embodiment of the present invention may be regarded as a method including those processing steps, a program that allows a computer to execute those processing steps, or a recording medium that stores the program.

What is claimed is:

1. An image processing apparatus comprising:
   image storing means that stores a plurality of content blocks of images, wherein each image has associated time information, and two of the content blocks of images were taken by different imaging devices and contain an overlap portion set of images that have overlap within a section of shooting time;
   feature extracting means that extracts feature amounts of each image stored in the image storing means;
   image selecting means that selects at least one of images included in the overlap portion set, stored in the image storing means, on the basis of the feature amounts associated with the respective images included in the overlap portion set; and
   digest-image generating means that generates a digest image of the images stored in the image storing means on the basis of the selected images, wherein the digest image includes at least one selected image from each of the two content blocks of images such that the selected images do not overlap within the section of shooting time.

2. The apparatus according to claim 1, further comprising:
   digest-score calculating means that calculates a digest score of each image, the digest score being obtained by weighting and adding the extracted feature amounts, wherein
   the image selecting means compares the calculated digest scores of the respective images included in the overlap portion set to select one image with the highest digest score.

3. The apparatus according to claim 1, wherein the digest-image generating means generates the digest image by arranging the selected images in time series.

4. The apparatus according to claim 1, wherein
   the images stored in the image storing means are moving images captured in time series, the feature extracting means extracts the feature amounts of each moving image stored in the image storing means in time series every predetermined section, the image selecting means selects at least one moving image segment in each section, where several or all of the moving images stored in the image storing means overlap with respect to the shooting time, on the basis of the feature amounts extracted in the section, and the digest-image generating means generates the digest image on the basis of the selected moving image segments.

5. The apparatus according to claim 4, further comprising:

overlap-shooting-section extracting means that extracts each overlap shooting section, serving as a section where at least one of the moving images stored in the image storing means overlaps another moving image with respect to the shooting time, on the basis of the time information, wherein the feature extracting means extracts the feature amounts of the respective moving images included in the extracted overlap shooting section, and the image selecting means selects a moving image segment in a section segment, where the moving images overlap with respect to the shooting time, of the extracted overlap shooting section.

6. The apparatus according to claim 5, wherein the overlap shooting section is a section that includes at least one of the moving images, stored in the image storing means, overlaps another moving image with respect to the shooting time and includes a predetermined number of moving images or more.

7. The apparatus according to claim 4, wherein the image selecting means selects a moving image segment that does not overlap another moving image with respect to the shooting time in each section where the moving images stored in the image storing means do not overlap with respect to the shooting time, and the digest-image generating means generates the digest image by arranging the selected moving image segments in time series.

8. The apparatus according to claim 4, further comprising:

digest-score calculating means that calculates a digest score of each moving image every predetermined section of each moving image, the digest score being obtained by weighting and adding the extracted feature amounts;

threshold holding means that holds a predetermined threshold; and digest-segment extracting means that extracts a digest segment corresponding to each digest score at or above the threshold among the calculated digest scores, wherein the image selecting means compares the calculated digest scores in the extracted digest segment to select a moving image segment with the highest digest score.

9. An image processing apparatus comprising:

image input means that inputs a plurality of content blocks of images, wherein each image has associated time information, and two of the content blocks of images were taken by different imaging devices and contain an overlap portion set of images that have overlap within a section of shooting time;

feature extracting means that extracts feature amounts of each input image;

image selecting means that selects at least one of images included in the overlap portion set on the basis of the feature amounts associated with the respective images included in the overlap portion set; and digest-image generating means that generates a digest image of the input images on the basis of the selected images, wherein the digest image includes at least one selected image from each of the two content blocks of images such that the selected images do not overlap within the section of shooting time.

10. A method of image processing for an image processing apparatus including image storing means that stores a plurality of content blocks of images, wherein each image has associated time information, and two of the content blocks of images were taken by different imaging devices and contain an overlap portion set of images that have overlap within a section of shooting time, feature extracting means, image selecting means, and digest-image generating means, the method comprising the steps of:

extracting feature amounts of each image stored in the image storing means;

selecting at least one of images included in the overlap portion set stored in the image storing means on the basis of the feature amounts associated with the respective images included in the overlap portion set; and generating a digest image of the images stored in the image storing means on the basis of the selected images, wherein the digest image includes at least one selected image from each of the two content blocks of images such that the selected images do not overlap within the section of shooting time.

11. A non-transient computer-readable storage medium including computer executable program instructions that, when accessed by a computer, causes the computer to perform a method of image processing for an image processing apparatus including image storing means that stores a plurality of content blocks of images, wherein each image has associated time information, and two of the content blocks of images were taken by different imaging devices and contain an overlap portion set of images that have overlap within a section of shooting time, feature extracting means, image selecting means, and digest-image generating means, the method comprising the steps of:

extracting feature amounts of each image stored in the image storing means;

selecting at least one of images included in the overlap portion set stored in the image storing means on the basis of the feature amounts associated with the respective images included in the overlap portion set; and generating a digest image of the images stored in the image storing means on the basis of the selected images, wherein the digest image includes at least one selected image from each of the two content blocks of images such that the selected images do not overlap within the section of shooting time.

12. An image processing apparatus comprising:

an image storing section that stores a plurality of content blocks of images, wherein each image has associated time information, and two of the content blocks of images were taken by different imaging devices and contain an overlap portion set of images that have overlap within a section of shooting time;

a feature extracting section that extracts feature amounts of each image stored in the image storing section;

an image selecting section that selects at least one of images included in the overlap portion set, stored in the image storing section, on the basis of the feature amounts associated with the respective images included in the overlap portion set; and a digest-image generating section that generates a digest image of the images stored in the image storing section on the basis of the selected images, wherein the digest image includes at least one selected image from each of the two content blocks of images such that the selected images do not overlap within the section of shooting time.

13. An image processing apparatus comprising:
an image input section that inputs a plurality of content blocks of images, wherein each image has associated time information, and two of the content blocks of images were taken by different imaging devices and contain an overlap portion set of images that have overlap within a section of shooting time;
a feature extracting section that extracts feature amounts of each input image;
an image selecting section that selects at least one of images included in the overlap portion set on the basis of the feature amounts associated with the respective images included in the overlap portion set; and
a digest-image generating section that generates a digest image of the input images on the basis of the selected images, wherein the digest image includes at least one selected image from each of the two content blocks of images such that the selected images do not overlap within the section of shooting time.

\* \* \* \* \*